(12) United States Patent
Drai et al.

(10) Patent No.: US 10,346,483 B2
(45) Date of Patent: Jul. 9, 2019

(54) SYSTEM AND METHOD FOR SEARCH ENGINE OPTIMIZATION

(75) Inventors: David Drai, Kfar Yona (IL); Udi Trugman, Alfie-Menashe (IL); Ronni Zehavi, Sunnyvale, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 133 days.

(21) Appl. No.: 13/499,666

(22) PCT Filed: Oct. 4, 2010

(86) PCT No.: PCT/US2010/002673
§ 371 (c)(1),
(2), (4) Date: Jul. 20, 2012

(87) PCT Pub. No.: WO2011/040981
PCT Pub. Date: Apr. 7, 2011

(65) Prior Publication Data
US 2012/0284252 A1  Nov. 8, 2012

Related U.S. Application Data

(60) Provisional application No. 61/247,953, filed on Oct. 2, 2009.

(51) Int. Cl.
*G06F 16/00* (2019.01)
*G06F 16/951* (2019.01)

(52) U.S. Cl.
CPC .................. *G06F 16/951* (2019.01)

(58) Field of Classification Search
CPC ..... Y10S 707/99933; Y10S 707/99935; Y10S 707/99932; Y10S 707/99939; Y10S 707/99931; G06F 17/30448; G06F 17/30522; G06F 17/30197; G06F 17/30457; G06F 17/30132; G06F 17/30386; G06F 17/30899; H04W 28/26; H04W 4/06
See application file for complete search history.

(56) References Cited

U.S. PATENT DOCUMENTS

| | | | |
|---|---|---|---|
| 6,397,217 B1 | 5/2002 | Melbin | |
| 6,496,856 B1 | 12/2002 | Kenner et al. | |
| 6,553,413 B1* | 4/2003 | Leighton et al. | ............. 709/219 |
| 6,638,314 B1* | 10/2003 | Meyerzon | ......... G06F 17/30864 707/999.01 |
| 6,957,383 B1* | 10/2005 | Smith | ................. G06F 17/3089 707/999.1 |

(Continued)

FOREIGN PATENT DOCUMENTS

| | | |
|---|---|---|
| EP | 0949571 | 10/1999 |
| WO | WO 0113578 A1 * | 2/2001 |

(Continued)

OTHER PUBLICATIONS

On the Use and Performance of Content Distribution Networks, Krishnamurthy et al, Proceedings of the 1st ACM SIGCOMM Workshop on Internet Measurement (IMW'01), pp. 169-182, 2001.*

(Continued)

*Primary Examiner* — Augustine K. Obisesan (57) ABSTRACT

A method for SEO by optimizing interactions with or through a CDN (content distribution network).

4 Claims, 5 Drawing Sheets

(56) References Cited

U.S. PATENT DOCUMENTS

| | | | |
|---|---|---|---|
| 6,976,053 B1* | 12/2005 | Tripp | G06F 17/30864 707/999.102 |
| 7,047,033 B2 | 5/2006 | Wyler | |
| 7,111,057 B1 | 9/2006 | Sherman et al. | |
| 7,194,522 B1 | 3/2007 | Swildens et al. | |
| 7,200,681 B1 | 4/2007 | Lewin et al. | |
| 7,574,486 B1 | 8/2009 | Cheng et al. | |
| 7,590,739 B2 | 9/2009 | Swildens et al. | |
| 7,613,685 B2* | 11/2009 | Jaepel | G06F 17/30867 |
| 7,653,689 B1* | 1/2010 | Champagne et al. | 709/206 |
| 7,752,258 B2 | 7/2010 | Lewin et al. | |
| 7,801,881 B1* | 9/2010 | Brawer | G06F 17/30864 707/709 |
| 7,865,497 B1* | 1/2011 | Pillai | G06F 17/30864 707/709 |
| 7,886,218 B2 | 2/2011 | Watson et al. | |
| 8,060,581 B2 | 11/2011 | Day et al. | |
| 8,255,489 B2 | 8/2012 | Afergan et al. | |
| 8,484,283 B2 | 7/2013 | Afergan et al. | |
| 8,805,965 B2 | 8/2014 | Day et al. | |
| 2002/0073075 A1* | 6/2002 | Dutta et al. | 707/3 |
| 2002/0078233 A1* | 6/2002 | Biliris | H04L 29/06 709/238 |
| 2003/0002484 A1* | 1/2003 | Freedman | H04L 45/02 370/352 |
| 2003/0120654 A1* | 6/2003 | Edlund et al. | 707/7 |
| 2003/0135487 A1* | 7/2003 | Beyer | G06F 16/951 |
| 2003/0163454 A1* | 8/2003 | Jacobsen et al. | 707/3 |
| 2004/0044962 A1* | 3/2004 | Green | G06F 17/30864 715/234 |
| 2004/0098377 A1* | 5/2004 | Kraft | 707/3 |
| 2004/0225642 A1* | 11/2004 | Squillante et al. | 707/3 |
| 2004/0225644 A1 | 11/2004 | Squillante | |
| 2005/0050000 A1 | 3/2005 | Kwok et al. | |
| 2005/0154718 A1* | 7/2005 | Payne et al. | 707/3 |
| 2005/0204276 A1 | 9/2005 | Hosea et al. | |
| 2006/0070022 A1* | 3/2006 | Ng | G06F 17/3089 717/104 |
| 2006/0173822 A1* | 8/2006 | Watson et al. | 707/3 |
| 2006/0190448 A1* | 8/2006 | Bartek | G06F 17/30873 |
| 2006/0235858 A1* | 10/2006 | Joshi et al. | 707/100 |
| 2007/0124506 A1* | 5/2007 | Brown | G06F 17/30873 709/252 |
| 2007/0168465 A1* | 7/2007 | Toppenberg et al. | 709/218 |
| 2007/0168517 A1* | 7/2007 | Weller et al. | 709/226 |
| 2007/0244883 A1* | 10/2007 | Bessieres | G06F 17/30864 |
| 2007/0271385 A1* | 11/2007 | Davis | G06F 11/203 709/228 |
| 2008/0016033 A1* | 1/2008 | Forstmann et al. | 707/3 |
| 2008/0071766 A1* | 3/2008 | Grieselhuber et al. | 707/5 |
| 2008/0071857 A1 | 3/2008 | Lie | |
| 2008/0086524 A1 | 4/2008 | Afergan et al. | |
| 2008/0098093 A1 | 4/2008 | Simon | |
| 2008/0120434 A1 | 5/2008 | Alstad | |
| 2008/0178122 A1* | 7/2008 | Besecker | G06F 17/3089 715/854 |
| 2008/0228920 A1 | 9/2008 | Souders et al. | |
| 2008/0281798 A1 | 11/2008 | Chatterjee et al. | |
| 2008/0306816 A1 | 12/2008 | Matthys et al. | |
| 2009/0083226 A1* | 3/2009 | Kawale et al. | 707/3 |
| 2009/0144395 A1* | 6/2009 | DeSalvo | G06F 17/30902 709/219 |
| 2009/0204638 A1* | 8/2009 | Hollier | G06F 17/3089 |
| 2009/0234799 A1* | 9/2009 | Betawadkar-Norwood et al. | 707/2 |
| 2009/0240674 A1* | 9/2009 | Wilde et al. | 707/4 |
| 2009/0254707 A1 | 10/2009 | Alstad | |
| 2009/0276488 A1 | 11/2009 | Alstad | |
| 2010/0050089 A1 | 2/2010 | Kim et al. | |
| 2010/0077098 A1* | 3/2010 | Fox | G06F 17/30864 709/233 |
| 2010/0080411 A1* | 4/2010 | Deliyannis | 382/100 |
| 2010/0138485 A1 | 6/2010 | Chow | |
| 2010/0250527 A1* | 9/2010 | Gnanamani et al. | 707/726 |
| 2010/0262592 A1* | 10/2010 | Brawer | G06F 17/30864 707/709 |
| 2011/0093533 A1* | 4/2011 | Kataria | G06F 17/30893 709/203 |
| 2011/0137973 A1 | 6/2011 | Wei et al. | |
| 2011/0314091 A1 | 12/2011 | Podjarny | |
| 2012/0124372 A1 | 5/2012 | Dilley et al. | |

FOREIGN PATENT DOCUMENTS

| | | | | |
|---|---|---|---|---|
| WO | WO 0186507 A1 | * | 11/2001 | |
| WO | WO 02071242 A1 | * | 9/2002 | |
| WO | WO-03005240 A1 | * | 1/2003 | G06F 17/30864 |
| WO | WO 2004036363 A2 | * | 4/2004 | |
| WO | WO 2006058075 A2 | * | 6/2006 | |
| WO | WO 2009019435 A1 | * | 2/2009 | |

OTHER PUBLICATIONS

Bickmore, T. et al., Digestor: device-independent access to the World Wide Web, Computer Networks and ISDN Systems, vol. 29, (Sep. 1997), pp. 1075-1082.

Brooks et al, "Application-Specific Proxy Servers as HTTP Stream Transducers," published at http://www.w3.org/Conferences/WWW4/Papers/56/, presented Dec. 13, 1995 at Fourth International World Wide Web Conference, Boston MA, USA, https://www.w3.org/Conferences/WWW4/Program_Full.html.

Wayback Machine Archive of Jul. 26, 2008 for http://www.w3.org/Conferences/WWW4/Papers/56/ showing Brooks et al, "Application-Specific Proxy Servers as http Stream Transducers," 9 pages (downloaded Mar. 29, 2016; available at https://web.archive.org/web/20080726134435/http://www.w3.org/Conferences/WWW4/Papers/56/).

Google et al.,"Major Search Engines Unite to Support a Common Mechanism for Website Submission ", press release, Las Vegas NV, Nov. 16, 2006, 3 pages, available at https://googlepress.blogspot.com/2006/11/majorsearchenginesunitetosupport_ 16.html (downloaded Oct. 7, 2016).

sitemaps.org Protocol,"Sitemaps XMLformat", web page for XML schema for Sitemap protocol at sitemaps.org, last updated Feb. 27, 2008 as shown at p. 8 bottom, 9 pages total, downloaded Oct. 6, 2016, available at http://www.sitemaps.org/protocol.html.

Wikipedia, "Site map—Wkipedia, the free encyclopedia", Oct. 6 2016 version of web page, available at https://en.wikipedia.org/wiki/Site_map, downloaded Oct. 6, 2016, 2 pages.

Wikipedia, "Site map—Wikipedia, the free encyclopedia", Sep. 23, 2009 version of web page, available at https://en.wikipedia.org/w/index.php?title=Site_map&oldid=315795052, downloaded Oct. 6, 2016, 2 pages.

Wikipedia, "Site map—Wikipedia, the free encyclopedia", Sep. 29, 2008 version of web page, available at https://en.wikipedia.org/w/index.php?title=Site_map&oldid=241789758, downloaded Oct. 6, 2016, 2 pages.

International (PCT) Search Report for PCT/US10/002673, of which this application is national stage; dated Jan. 24, 2011, 4 pages.

International (PCT) Preliminary Report on Patentability and Written Opinion for PCT/US10/002673, of which this application is national stage; dated Apr. 3, 2012, 8 pages.

Edwards et al., "An adaptive model for optimizing performance of an incremental web crawler" Proceedings of the 10th International Conference on World Wide Web, 2001, pp. 106-113.

Anonymous: "Content Delivery Network", online Wikipedia article archived at http://web.archive.org/web/20071112013322/http://en.wikipedia.org/wiki/Content_delivery_network, purported date Nov. 12, 2007, downloaded from web.arcihve.org on Jul. 20, 2012, 3 pages.

* cited by examiner

SYSTEM AND METHOD FOR SEARCH ENGINE OPTIMIZATION

CLAIM OF PRIORITY

This application is the National Stage of International Application No. PCT/US2010/002673, filed Oct. 4, 2010, which claims the benefit of priority to U.S. Provisional Patent Ser. No. 61/247,953, entitled "SYSTEM AND METHOD FOR SEARCH ENGINEER OPTIMIZATION", filed Oct. 2, 2009, which is hereby incorporated by reference in its entirety.

FIELD OF THE INVENTION

The present invention relates to search engine optimization and in particular, to such an optimization through interactions with a CDN (content distribution network).

BACKGROUND OF THE INVENTION

Search engine optimization (SEO) is the process of improving the volume and quality of traffic to a web site from search engines via "natural" ("organic" or "algorithmic") search results. Typically, the earlier a site appears in the search results list, the more visitors it will receive from the search engine. SEO may target different kinds of search, including image search, local search, and industry-specific vertical search engines.

As an Internet marketing strategy, SEO considers how search engines work and what people search for. Optimizing a website primarily involves editing its content and HTML coding to both increase its relevance to specific keywords and to remove barriers to the indexing activities of search engines.

Currently, such an optimization is done by consultants who carry out optimization projects on behalf of clients, and by employees who perform SEO services in-house. Search engine optimizers may offer SEO as a stand-alone service or as a part of a broader marketing campaign. Because effective SEO may require changes to the HTML source code of a site as well as to the site's structure and hierarchy, and also changes to the HTTP server, SEO tactics are effectively incorporated into web site development and design.

In recent years, the terms white hat and black hat have been applied to the Search Engine Optimization (SEO) industry. Black hat SEO tactics such as spamdexing, attempt to redirect search results to particular target pages in a fashion that is against the search engines' terms of service, whereas white hat methods are generally approved by the search engines. White hat tactics tend to produce results that last a long time, whereas black hats anticipate that their sites may eventually be banned either temporarily or permanently once the search engines discover what they are doing. Search engines might ban a site which is suspected of using black had methods. Therefore, it is important to carefully select SEO tactics and strategies, in order to avoid being banned by search engines, while still optimizing traffic to the web site.

Unfortunately, there is currently no system and method for automatic and efficient search engine optimization while preventing the banning of "innocent" sites.

SUMMARY OF THE INVENTION

The background art does not teach or suggest how to automatically and efficiently perform search engine optimization through interactions with CDNs (content distribution networks).

The present invention overcomes these deficiencies of the background art by utilizing the information residing in the CDN to which the web site is connected for optimizing the search results for the web site, by optimizing interactions with search engines through SEO (search engine optimization) and by modifying the site, which in turn also affects the user's experience in order to improve the interactions of the user with the web site.

According to some embodiments, the present invention optimizes the search engine results by improving the sitemap or by creating a new sitemap, in the case that the site map is not generated by the site. A site map (or sitemap) is a representation of the architecture of a web site. Site maps can improve search engine optimization of a site by making sure that all the pages can be found. The ability to locate all pages is especially important if a site uses Adobe Flash or JavaScript menus that do not include HTML links or if a site is large. The site map is typically, but not necessarily, created according to the database of the web site with regard to the pages of the web site and also the policy of site manager or owner.

According to some embodiments of the present invention, the site map is preferably improved in order to improve access of a search engine "crawler" to the site. Improving the site map is preferably performed according to the policy of the site manager or owner and also according to the desire to expose or emphasize certain types of information and/or web pages; and optionally also by identifying which pages have been recently changed by indicating the date and time and the content of the change. Optimizing the site's coverage through improvements to the site map improves overall access to the site. Such an update enables fast access to these pages by the search engine and optimizes the crawler's visit to the site by helping it access more pages and increasing the site's coverage. Such an update can be done automatically by the CDN using existing information.

According to another embodiment of the present invention, the system and method eliminates the presentation of irrelevant information such as java scripts, which are used for user interface. Such a modification preferably optimizes the search for the crawler, without penalizing the site.

According to another embodiment, the present invention prevents the duplication of web pages. Duplication of pages reduces the rank of the page due to several reasons such as, for example, splitting the rank between the pages, since the total number of links directed to any particular page becomes split between a plurality of pages, thereby reducing the rank of each such page. The CDN can identify the duplication while serving the pages and notify the site owner and/or automatically prevent or resolve the duplication, for instance by providing the appropriate HTTP code and referring all duplications to one URL. Duplication is tracked by, for example, analyzing the CDN instructions or by checking the checksum of the cached objects. For example, the CDN instructions can be analyzed to determine whether there are two different URLs pointing to the same content from the origin and/or by comparing files that are provided by the same site, to locate any such duplication.

A slightly different implementation will detect duplications of important sections within different pages, and will either alert or change the provided pages. In this case, typically the HTML itself will be different, due to the fact that it will also display different "marginal" sections in the page, such as recommendations, comments. The important parts of the page are the title, description, and so on, although the determination of one or more important parts may also optionally depend upon the logic of the web site and of each page within. For example detecting in an ecommerce site two identical items, with identical description but with a slightly different title, and different user comments and product recommendations on the page. This could be done automatically or for instance could be configured by the site manager, after providing a template for the structure of a page (for instance the structure of an "item page") and specifying which fields are significant and which fields could be ignored.

Such a comparison may also optionally be performed between web sites, as for example copying from a web site may be considered to be forbidden by a search engine. In this case, the comparison also depends upon segmentation of the web page and comparison of different segments between different pages.

According to another embodiment, the system and method optionally transfers the relevant web crawler logs to the site for analysis. Information provided by the logs includes but not limited to the average time for fetching a page by the crawler, the average number of the site's pages read by the crawler, the number of sessions per day, the overall time that the crawler spends on the site per day, the trends of these statistics along time, and the like. According to this embodiment, the system and method can optionally provide statistical information regarding other sites and compare the site's statistical information to the other sites. Such statistical information preferably enables the site owner to improve the web site with regard to interactions with the web crawler of the search engine, hence providing improved SEO characteristics. The system can optionally provide statistical information about the number of accesses to the sites in order to monitor the optimization process.

According to another embodiment, the system and method enables presentation of a default page or a page that is currently cached by the CDN, when the site cannot be accessed by the crawler, as a result of a server failure, for example.

According to another embodiment, the CDN can provide pre-cached pages to the crawler, improving the speed of the page download and thereby enabling the crawler to view more pages in a given time. Increasing the rapidity with which the website provides pages and improving the website's performance typically improves the site search rank.

According to another embodiment, the CDN can provide a tool to easily mark and modify HTML tags related to the pages of the website for improving their rank and relevancy towards certain keywords; for example, the CDN can modify erroneous or faulty tags according to best practices, and/or notify the website owner of their existence. The determination of the best or preferred action to be taken may also optionally be determined with regard to a policy determined by the website owner, for example.

According to another embodiment, the CDN can provide a tool for enabling URL rewrite rules without impacting the underlying site hosted on the origin server. This is preferably done by configuring the set of rules per each page type on a dedicated GUI provided by the CDN. This embodiment enables virtual restructuring of the site without the need to actually change the underlying infrastructure of the site and without any requirement for increased resources by the servers of the site. Restructuring can enable the website owner to test new keywords, phrases and products, and increase a page rank by adding descriptive fields to the URL. For example, adding the word "table" to the URL of a table for sale would be expected to increase the search rank for the URL. Also, some search engines ignore certain types of information provided through the URL, such as terms after the question mark ("?") indicator, since information after this indicator relates to a query string, which contains data to be passed to various scripts and web applications for example.

According to another embodiment, the CDN optionally provides a tool for easily modifying webpage titles, and other fields of a given page, without a required modification of the underlying site. In another variation of this embodiment, the CDN preferably provides an alert when the underlying site implements fields or uses words that can be penalized by search engines. The CDN can also block or modify such problematic fields or words and set them to predefined default values whenever encountered.

According to another embodiment, the CDN can provide a tool for easily managing and/or modifying header metadata. This data when managed correctly can provide additional information on the site and/or the specific page and by doing so, can increase the site's rank for specific terms. The below is a non-limiting, illustrative example of a meta header:

X-Meta-Author: PopularMedia
X-Meta-Copyright: Copyright 2008, PopularMedia
X-Meta-Description: We deliver social networking functionality that amplifies your message and your brand.
X-Meta-Keywords: social media marketing, social media marketing technology, social media marketing platform, social media marketing, products, social media marketing services, social media marketing tools, popularmedia, popular media, word of mouth marketing, word of mouth technology, word of mouth platform, word of mouth products, word of mouth services, word of mouth tools, word-of-mouth marketing, word-of-mouth technology, word-of-mouth platform, word-of-mouth products, word-of-mouth services, word-of-mouth tools
X-Meta-Language: English
X-Meta-Robots: noindex, nofollow According to another embodiment, the CDN service can be configured so that whenever the customer origin returns an HTTP-404 response on a page request (which indicates that the requested web page is not available from the web server, although contact was successfully made with the server), the CDN will check if that page is cached in the system, and if so will return the cached page (even if expired). This process improves the overall user experience when accessing the site, as well as the search rank, as returning a 404 code on an existing page may indicate problems of website stability and can penalize the site's rank.

According to another embodiment, the CDN monitors the returned HTTP response codes from the customer origin and alerts the site's owner if the codes do not follow best practices and search engine guidelines. On another implementation, the CDN optionally modifies the codes so that the response will follow the guidelines. For example, the CDN optionally provides a GUI through which the site's administrator can manage, configure, modify and set default values to HTTP responses. For example, when changing/moving a URL from one location to another, it is important to redirect requests for the old URL to the new URL with the correct code (301—moved permanently) and not with the common 302 (moved temporarily).

According to another embodiment, the CDN optionally helps in localization efforts, which in turn helps improve the site's search rank. By serving the content from a location close to the end user (preferably the same country), and delivering localized content from IPs in the local country.

This improves SEO (as well as performance), and helps the localization efforts, especially when the content is different for the localized sites.

According to another embodiment, the CDN optionally provides a tool for monitoring and boosting keywords on site (keyword optimization), as well as for providing feedback on specific words, for example with regard to popularity, usage in various types of queries and so forth.

It should be noted that the embodiments described herein are provided as an example only and the system and method can optionally apply any rule for search engine optimization by using the CDN as a mediator between the site and the search engine and by using the relevant information that is stored at the CDN.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or stages manually, automatically, or a combination thereof. Moreover, according to actual instrumentation and equipment of preferred embodiments of the method and system of the present invention, several selected stages could be implemented by hardware or by software on any operating system of any firmware or a combination thereof. For example, as hardware, selected stages of the invention could be implemented as a chip or a circuit. As software, selected stages of the invention could be implemented as a plurality of software instructions being executed by a computer using any suitable operating system. In any case, selected stages of the method and system of the invention could be described as being performed by a data processor, such as a computing platform for executing a plurality of instructions.

Although the present invention is described with regard to a "computer" on a "computer network", it should be noted that optionally any device featuring a data processor and/or the ability to execute one or more instructions may be described as a computer, including but not limited to a PC (personal computer), a server, a minicomputer, a cellular telephone, a smart phone, a PDA (personal data assistant), a pager, TV decoder, game console, digital music player, ATM (machine for dispensing cash), POS credit card terminal (point of sale), electronic cash register. Any two or more of such devices in communication with each other, and/or any computer in communication with any other computer may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION

The present invention is of a system and method for search engine optimization, which is done by using the CDN.

Figure 1:
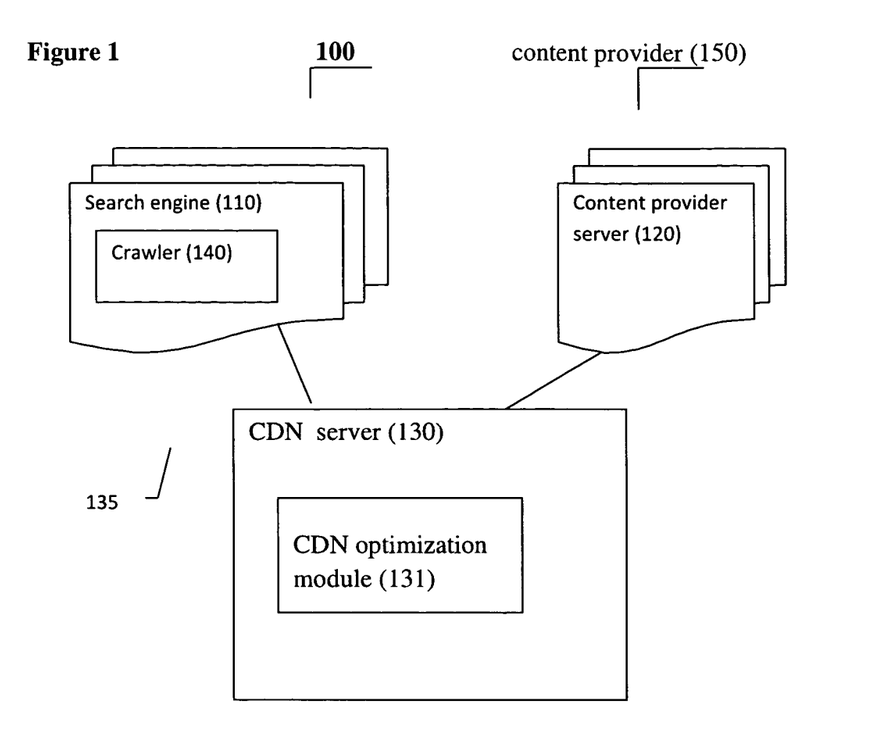
FIG. 1 is a schematic drawing of the system.

FIG. 1 is a schematic drawing of an exemplary, illustrative system according to the present invention. As shown, a system 100 features a CDN server 130 which is connected to a content provider 150, featuring a plurality of content provider servers shown as content provider server 120, and to a plurality of search engines such as, for example, Yahoo and Google which are shown as a search engine 110. Each search engine 110 features one or more crawlers 140; in some cases, a search engine 110 may optionally have a plurality of different crawlers for different functions (text vs images, for example). The crawler 140 is a computer program that browses the World Wide Web in a methodical, automated manner. Web crawlers are mainly used to create a copy of all the visited pages for later processing by a search engine that will index the downloaded pages to provide fast searches. The crawler 140 accesses sites that are connected to a CDN server via the CDN server. Such policies include but not limited to a selection policy that states which pages to download, a re-visit policy that states when to check for changes to the pages, a politeness policy that states how to avoid overloading Web sites, and a parallelization policy that states how to coordinate distributed Web crawlers.

The present invention preferably utilizes the CDN 135 for optimizing the search results of the sites, represented by the content provider servers 120, which are connected to the CDN 135. Such an optimization is preferably done by the CDN optimization module 131. CDN optimization module 131 preferably uses the information regarding the site that resides in the CDN server 130 in order to better adjust to the search engine 110 policies and thus provide better search results for the site (provided by content provider server 120). Such an optimization includes but not limited to improving site map, avoiding duplication of pages and the like. The CDN server 130 preferably saves statistical information regarding the search engine 110. Such information can be, for example, information regarding the number of visits of the search engine 110 in these sites, the page fetching time and the like. This information is available for the site manager in order to optimize the search engine results. CDN server 130 is preferably connected to the content provider servers 120 via the internet. CDN server 130 is preferably connected to the search engine 110 via the internet.

Figure 2:
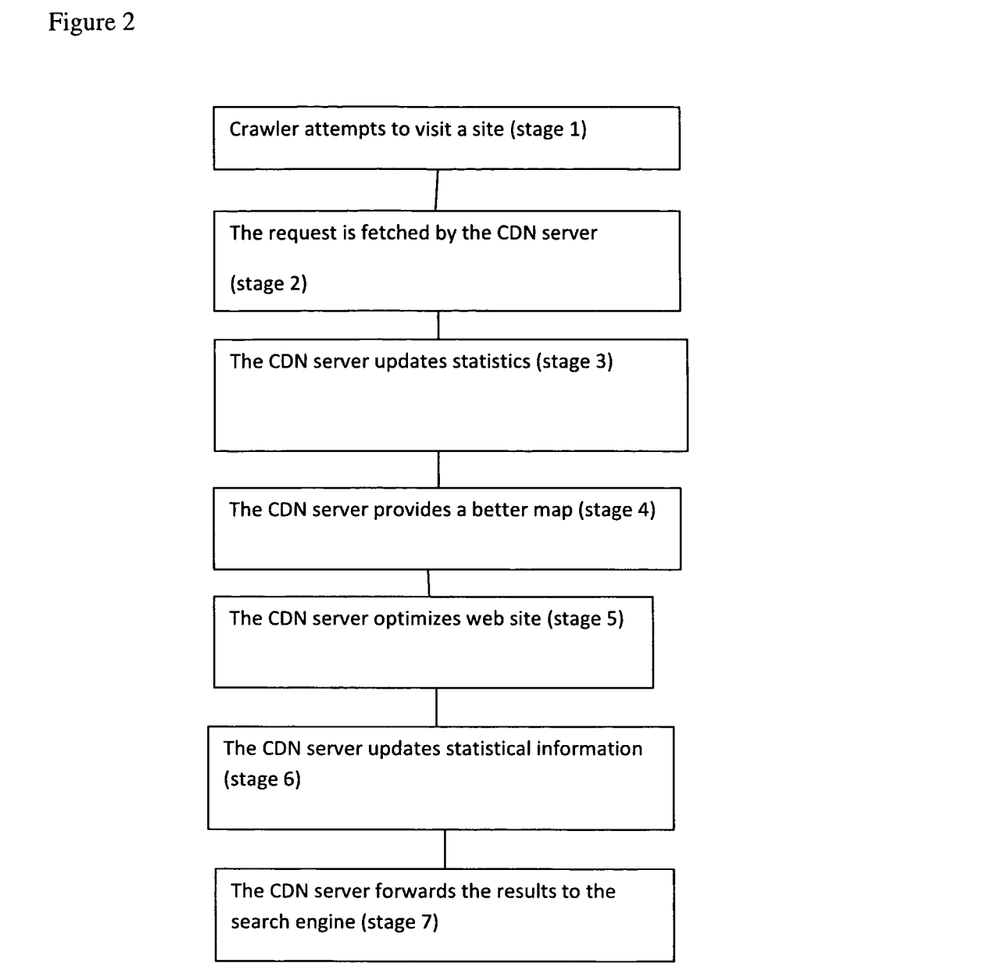
FIG. 2 is a high-level exemplary flow diagram of the search-engine optimization process.

FIG. 2 is a high-level exemplary flow diagram of the search-engine optimization process. In stage 1, the crawler attempts to visit the site. In stage 2, since the site is connected to a CDN, the CDN server fetches the crawler's request for one or more items stored by the CDN and returns the items to the crawler. In stage 3, the CDN server updates statistics regarding the interaction between the search engine and this site. Such statistical information can be, for example and without wishing to be limited, the number of times per a day that the search engine visits this site. In stage 4, the CDN server, based on the information that has been aggregated from functioning as a content delivery network server for this site, preferably updates the site map so the crawler retrieves an improved site map in future visits. Improving the site map, according to the embodiment is preferably done by dynamically updating the recent visited pages in the site map. Such an update enables fast access to these pages by the search engine.

In stage 5, the CDN server (and more specifically the optimization module communicating with the CDN server) preferably optimizes the web site by, for example and without wishing to be limited, preventing the duplicating of web pages and eliminating irrelevant information. In stage 6, the CDN server updates more statistical information such as, for example and without wishing to be limited, statistical information regarding the time period which takes the crawler to fetch information from the site. In stage 7, the search result information is transferred from the CDN server to the search engine server. It should be noted that all actions of the CDN server with regard to the optimization are preferably done by a dedicated optimization module, for example as shown in FIG. 1.

Figure 3:
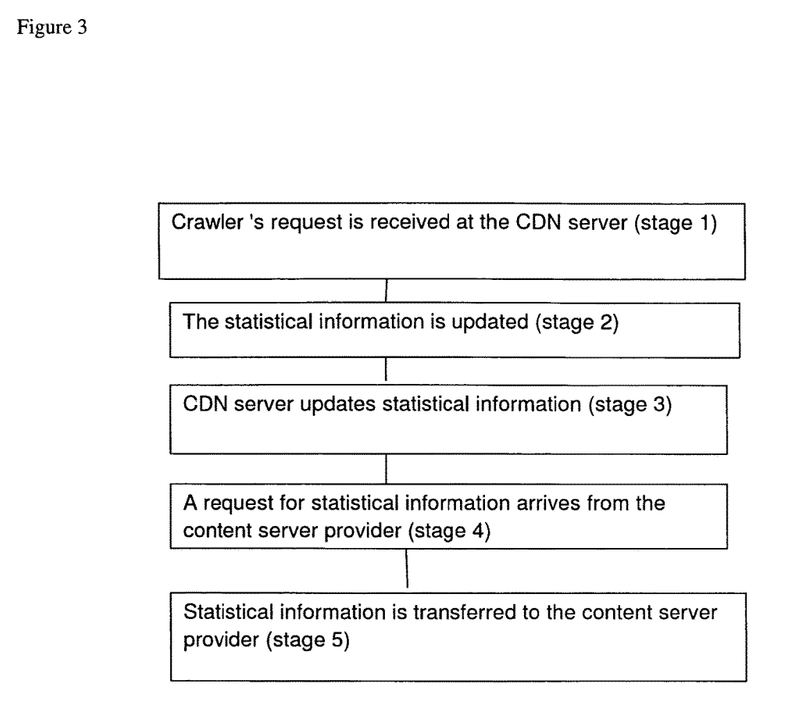
FIG. 3 is a high-level exemplary flow diagram of the process for gathering statistical information regarding the search engine operation on a specific site.

FIG. 3 is a high-level exemplary flow diagram of the process for gathering statistical information regarding the search engine operation on a specific site. According to one embodiment, the system and method can optionally provide statistical information regarding the other sites and compare the site's statistical information to the other sites' information. The system can also provide statistical information regarding the interaction between one or more search engines and the site's content provider server. Such statistical information preferably enables the site owner to improve the SEO.

Referring now to the drawing; in stage 1, the crawler's request for fetching information from the site is received at the CDN server. In stage 2, statistical information regarding the interaction between the content server provider and the search engine is updated. Such information includes but not limited to information regarding the rate of the access, information regarding the time of the access and the like.

In stage 3, the CDN server updates the statistical information regarding the interaction between the search engine and this site. Such information includes but not limited to, the access time of the search engine and the like. In stage 4, a request for statistical information arrives from the content server provider. Such a request can arrive independently of the process that is described in stages 1-3. In stage 5, the CDN transfers to the content server provider the relevant statistical information. Such information can include information regarding the interaction between the content server provider and one or more search engines and information regarding the interaction between other content server providers and other search engines. It should be noted that all actions of the CDN server with regard to the optimization are preferably done by a dedicated optimization module, for example as shown in FIG. 1.

Figure 4:
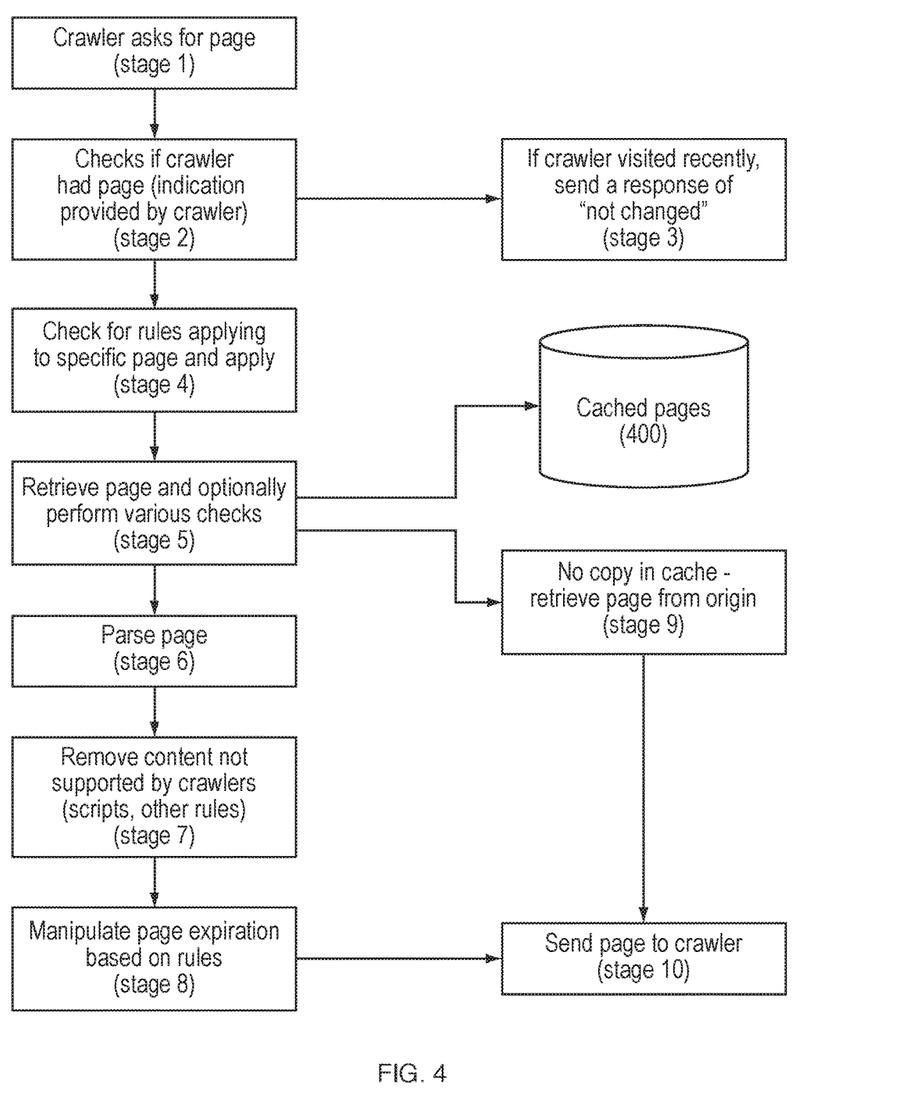
FIG. 4 is a high-level exemplary flow diagram of the process for changing the web page before it is provided to the search engine web crawler.

FIG. 4 is a high-level exemplary flow diagram of the process for changing the web page before it is provided to the search engine web crawler. In stage 1, the crawler asks for a web page from the site. In stage 2, the system checks to see whether the crawler already received the web page, according to an indication provided by the crawler. In the header of the request, there is an indication of the last time of modification, called "if modified since", to avoid reviewing non-modified pages.

In stage 3, if the web crawler visited recently, then the crawler is informed that the web page has not changed, optionally even if it is not known whether the web page has been modified.

In stage 4, the system looks for any applicable rules (such as rewrite rules for example); if one or more such rules exist, then the one or more rules are applied. In stage 5, the system retrieves the web page from the cache (shown as item 400), for example according to one or more of the page itself, expiration date, and any one or more rules, even when page is flagged as no cache. The system preferably searches for cached pages for crawlers, as an option for implementation, for example to avoid problems with scripts or other issues that may be problematic for web crawlers to handle.

In stage 6, the retrieved web page (from the cache) is preferably parsed. In stage 7, content that is not supported by the crawler (for example, optionally including but not limited to scripts or other problematic items, optionally according to one or more other rules) is preferably removed.

In stage 8, the system may optionally manipulate page expiration based on one or more rules, for example to extend the expiration date/time in order to avoid unnecessarily changing web pages, and thereby also avoiding unneeded and/or repeated crawler requests.

If there is no copy in the cache, then the system obtains the web page from the customer origin in stage 9.

In any case, the system provides the web page to the crawler in stage 10.

Figure 5:
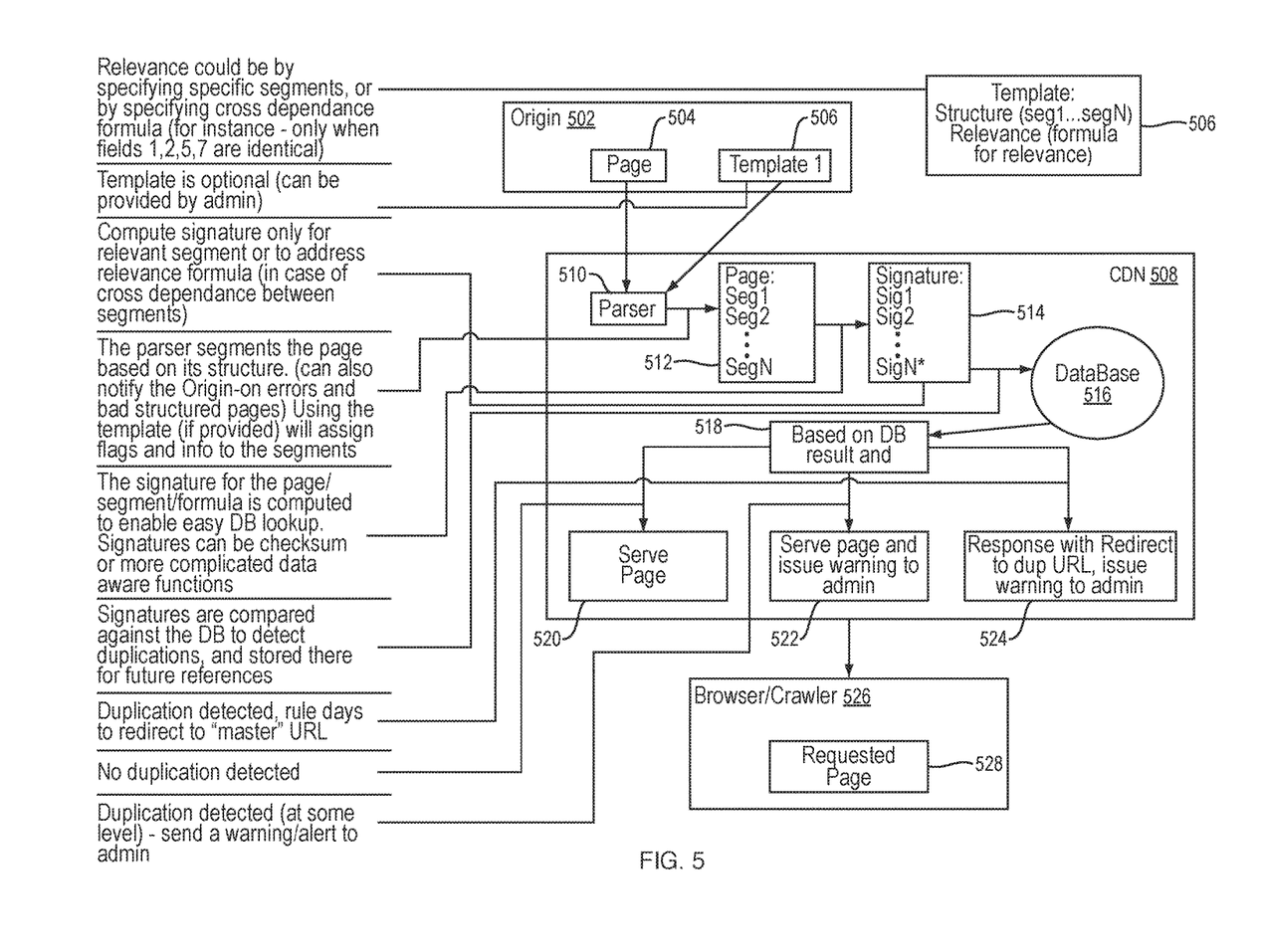
FIG. 5 relates to an exemplary flow process according to the present invention.

FIG. 5 relates to an exemplary flow process according to the present invention. A flow process 500 preferably features a customer origin 502, comprising one or more web pages 504 and at least one template 506 (also shown in more detail to the right). Template 506 is optional; for example, it may optionally be provided by the system administrator. Template 506 preferably features a structure having a plurality of N segments from seg1 to segN, as well as a formula for relevance. Relevance could optionally be determined by specifying specific segments or by specifying a cross dependence formula (for example, only when fields 1, 2, 5 and 7 are identical).

Page 504 and template 506 are then preferably provided to a CDN 508, and more preferably to a parser 510 within CDN 508. Parser 510 then passes the information to form a page 512, preferably featuring a plurality of segments as shown. Parser 510 preferably segments page 512 according to its structure; optionally and more preferably, parser 510 notifies customer origin 502 of any errors or problematic page structures. Parser 510 preferably uses template 506, if provided, to assign flags and information to the segments.

A signature 514 is then preferably determined for page 512, both of which are then stored in a database 516. Signature 514 is preferably determined by segment, such that each segment has its own signature as shown. If there is cross-dependence between segments, then the signature computation is preferably performed to address the relevance formula. Signature 514 is optionally and preferably computed for rapid database look-up in database 516. Signature 514 is optionally a checksum or alternatively, may optionally be determined according to a more complicated "data aware" formula.

Also, signatures 514 are preferably analyzed in order to avoid duplicate pages being stored in database 516. According to the result of such analysis 518, if no duplication is detected then the page may be served 520. If at least some level of duplication is detected and rule indicates that a warning is to be provided to the administrator, then the page is served 522 and the warning is provided. If duplication is detected at a sufficient level and the rule indicates that the page request should be redirected to the duplicate URL, then redirection is preferably performed 524 and the administrator is also optionally warned.

CDN 508 then provides the web page to a browser or crawler 526, which receives the requested page 528.

While the invention has been described with respect to a limited number of embodiments, it will be appreciated that many variations, modifications and other applications of the invention may be made.

What is claimed is:

1. A system for optimizing search engine results using a content distribution network (CDN), the system comprising:
    a content distribution network (CDN) comprising a plurality of CDN servers connected to a plurality of content provider servers via the Internet;
    wherein the plurality of CDN servers provide website objects from the plurality of content provider servers to web crawlers associated with search engines;
    in the plurality of CDN servers, a given CDN server that is programmed to send a site map for a website to a given web crawler associated with a search engine, the site map having been modified by the given CDN server or another CDN server in the plurality of CDN servers after being retrieved from a given content provider server, the modification of the site map improving the given web crawler's access to the website, so as to increase the search rank of a first website object within the search engine associated with the given web crawler;
    wherein the given CDN server or another CDN server are programmed to modify the site map at least by:
        receiving a first request for the first website object from the given web crawler, the first website object being a first page on the website, the first page being HTML coding;
        returning the first page to the web crawler, in response to the first request from the given web crawler;
        updating the site map, wherein said updating comprises updating the date and time of changes to the first page in the site map;
        sending the site map, with said updating, to the given web crawler upon a future visit by the given web crawler;
    the given CDN server further being programmed to:
        in response to the first request, update stored information that comprises time of access to the website by the given web crawler;
        after the update to the time of access, receive a second request for the first website object from the given web crawler, wherein the second request includes an 'if-modified-since' header;
        when the CDN server does not know the whether the website object has been modified since the time indicated by the 'if-modified-since' header received from the given web crawler in the second request, the CDN server determining to send the given web crawler a response to the second request indicating that the first page has not changed based on the updated time of access by the given web crawler.

2. The system of claim 1, wherein the given CDN server is programmed to modify the site map, according to a policy communicated to the CDN by the web site owner.

3. The system of claim 1, wherein the site map was created by the given CDN server or another CDN server.

4. A method, for optimizing search engine results using a content distribution network (CDN), the method comprising:
    providing a content distribution network (CDN) comprising a plurality of CDN servers connected to a plurality of content provider servers via the Internet;
    with the plurality of CDN servers, providing website objects from the plurality of content provider servers to web crawlers associated with search engines;
    in the plurality of CDN servers, a given CDN server sending a site map for a web site to a given web crawler associated with a search engine, the site map having been modified by the given CDN server or another CDN server in the plurality of CDN servers after being retrieved from a given content provider server, the modification of the site map improving the given web crawler's access to the web site, so as to increase the search rank of a first web site object within the search engine associated with the given web crawler;
    wherein said modification by the given CDN server or another CDN server comprises:
        receiving a first requests for a first website object from the given web crawler, the first website object being a first page on the web site, the first page being HTML coding;
        returning the first page to the given web crawler, in response to the first request from the given web crawler;
        updating the site map, wherein said updating comprises indicating updating the date and time of changes to the first page in the site map;
        sending the site map, with said updating, to the given web crawler upon a future visit by the given web crawler;
    the given CDN server, in response to the first request, updating stored information that comprises time of access to the web site by the given web crawler;
    after the update to the time of access, receiving a second request for the first web site object from the given web crawler, wherein the second request includes an 'if-modified-since' header;
    when the CDN server does not know the whether the website object has been modified since the time indicated by 'if-modified-since' header receive from the given web crawler in the second request, the CDN server determining to send the given web crawler a response to the second request indicating that the first page has not changed based on the updated time of access by the given web crawler.

* * * * *